Figure 1:
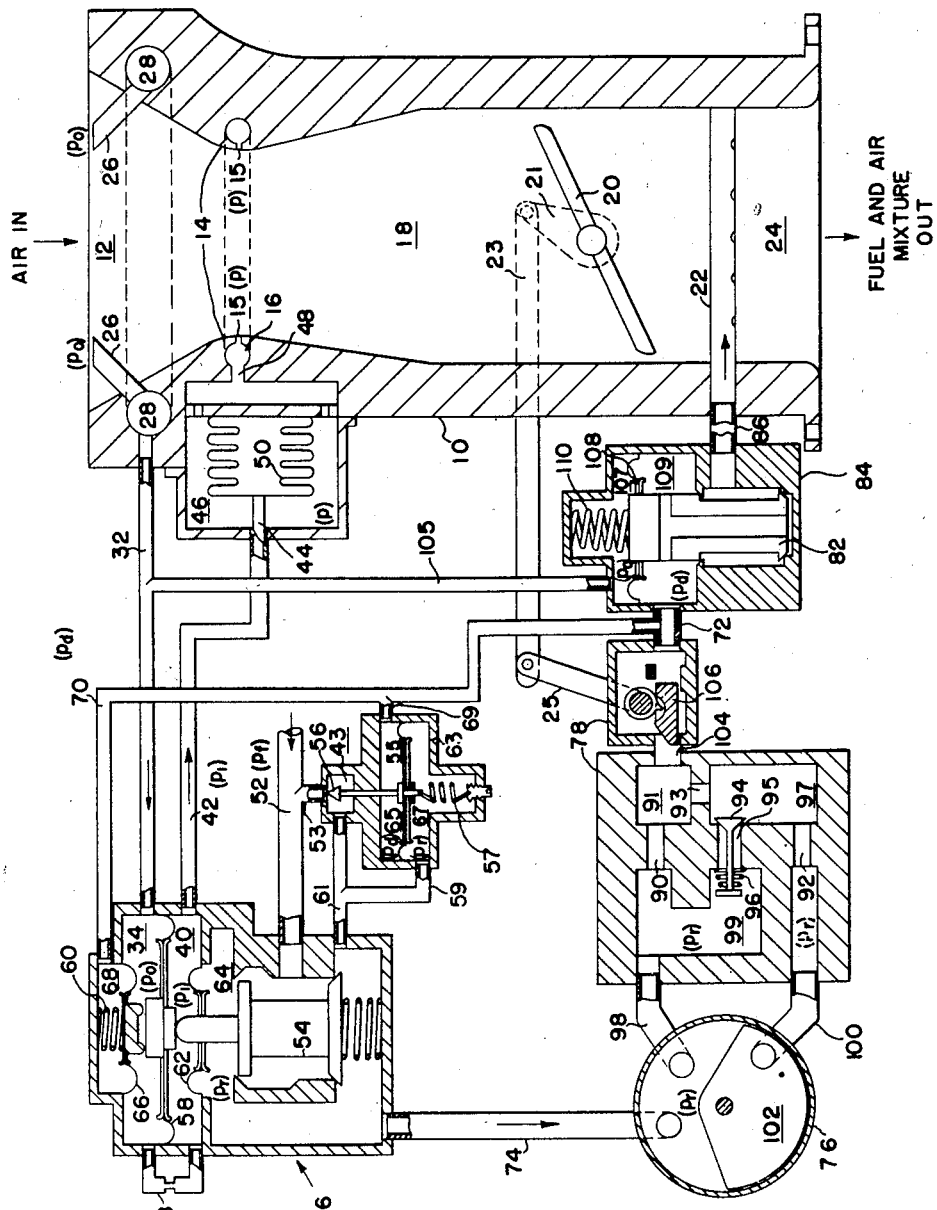

July 3, 1951  J. M. BARR  2,558,921
CARBURETOR

Filed Jan. 16, 1946  2 Sheets-Sheet 2

INVENTOR.
John M. Barr
BY
Lester W. Clark
AGENT

Patented July 3, 1951

2,558,921

UNITED STATES PATENT OFFICE 2,558,921

CARBURETOR

John M. Barr, Elmwood, Conn., assignor, by mesne assignments, to Niles-Bement-Pond Company, West Hartford, Conn., a corporation of New Jersey Application January 16, 1946, Serial No. 641,532

16 Claims. (Cl. 261—41)

The present invention relates to carburetors for internal combustion engines, and particularly to means for controlling the fuel-to-air ratio within a pre-determined range of low air flow.

In modern aircraft carburetors in which fuel flow is made proportional to air flow by varying the metering head, or fuel pressure differential, across a calibrated orifice, in accordance with an air metering pressure differential which varies according to air flow, the essential elements are: an air-meter which supplies an air pressure differential measuring air flow, an "air" diaphragm on which such differential acts to produce a force, a "fuel" diaphragm, or equivalent structure, subjected to fuel metering head pressure differential and supplying an opposing force, and a fuel valve subjected to both forces in a manner such that equilibrium is obtained only when the opposed forces are equal, or when fuel flow is proportional to air flow and the fuel-to-air ratio is constant.

At low air flow, however, the engine requires a greater proportion of fuel than is obtained if a constant fuel-to-air ratio suitable for higher air flows is maintained. The conventional remedy for the resulting fuel deficiency consists of biasing the air diaphragm with a spring which tends to increase metering head to values beyond those normally produced by the air metering differential. This measure provides a substantially constant increment of fuel metering head which increases the fuel-to-air ratio throughout the entire air flow range, the increase at any value of air flow being inversely proportional to air flow at that point. It is therefore impossible to utilize this measure as a means of satisfactorily increasing fuel flow at certain low air flows only, without encountering the possibility of prohibitive fuel-to-air ratio increase beyond the point of air flow at which no such increase is desired.

It is therefore an object of the present invention to meter fuel flow independently of air flow, in selected low air flow ranges of operation, and to provide a constant fuel pressure differential within such ranges of air flow without interfering with the design or normal functioning of the carburetor beyond the range of low air flow specified.

Another object of this invention is to provide a carburetor which may be easily adjusted to produce constant fuel pressure differential from the point of zero air flow to any other selected point of air flow, the constant fuel pressure differential being that normally obtained as a function of air flow at the point of adjustment, there being no fuel flow interruption or irregularity at the point of air flow at which transition occurs from flow caused by constant fuel pressure differential to flow produced by normal fuel pressure differential.

A further object of this invention is to provide means independent of air pressure differential for positioning the main fuel valve within a predetermined range of low air flow, and to render all fuel flow caused by constant fuel pressure differential in the low air flow range subject to complete cut-off.

Figure 2:
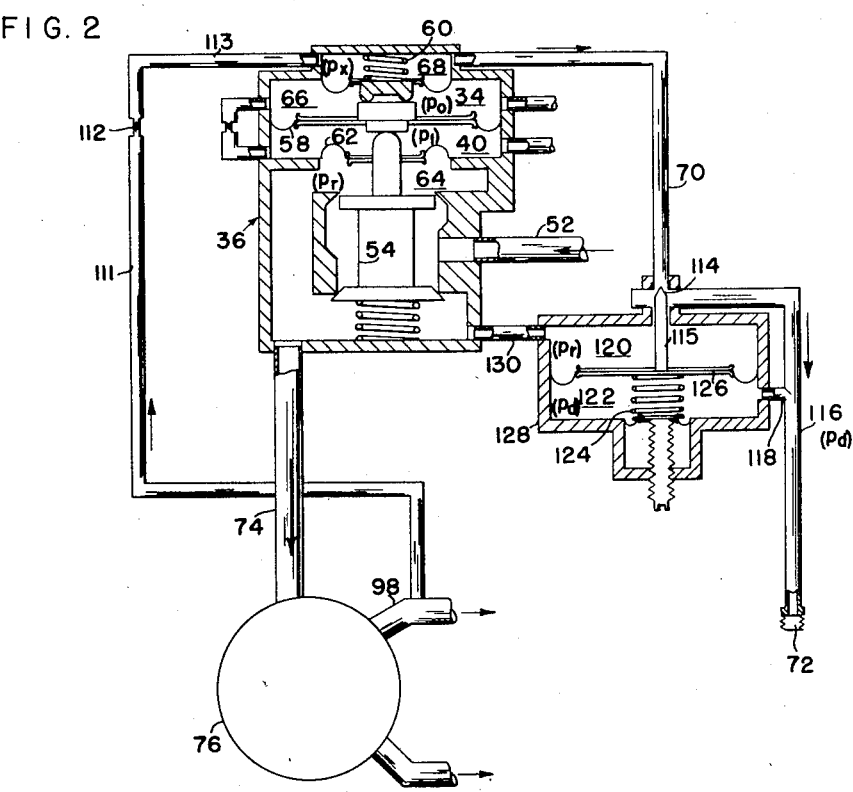
Figure 3:
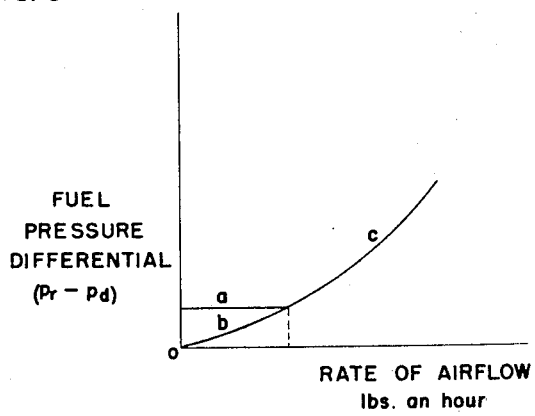

Other objects and advantages of the present invention will become apparent from a consideration of the appended specification, claims and drawings, in which:

Figure 1 illustrates, somewhat diagrammatically, a carburetor for an internal combustion engine, including a valve mechanism embodying the principles of my invention, Figure 2 illustrates the fuel meter shown as part of Figure 1 and another differently disposed valve mechanism embodying the same principles, and Figure 3 illustrates, graphically, certain fuel pressure differential characteristics obtainable by use of valve mechanisms of Figures 1 and 2.

Reference characters designating the pressures existing in the various units, which have been shown on the drawing in parentheses, are itemized as follows for reference purposes:

$p_0$=Air pressure at impact tubes.
$p$=Air pressure at Venturi throat.
$p_1$=Regulated air pressure at fuel meter.
$p_0-p$=Venturi air pressure differential.
$p_0-p_1$=Effective air pressure differential.
$p_i$="Inlet" fuel pressure from fuel pump.
$p_r$="Regulated" fuel pressure.
$p_d$="Discharge" fuel pressure.
$p_r-p_d$=Fuel pressure differential across jet system.

Figure 1

Referring to the drawing, there is shown a body 10 of a carburetor for an internal combustion engine, the interior of which serves as a conduit for all air delivered into the engine. Air enters at an inlet 12; and flows thru a metering venturi 14 and a passage 18, past a throttle 20 and a fuel discharge nozzle 22, to an outlet 24. A supercharger may be used upstream from inlet 12, or downstream from outlet 22; or a combination of superchargers so located may be employed.

Pressure head at the throat of venturi 14 is rendered measurable by provision of ports 15 leading to interconnected channels 16, the number of ports 15 and their location being such as will permit an accurate measure of static pressure ($p$) at entrance to ports 15.

Total head at the inlet 12 is rendered measurable by provision of impact tubes 26 leading to interconnected channels 28, the number and location of impact tubes 26 being such that a satisfactory traverse of the air stream is obtained at the outer ends of tubes 26, which are open to receive impact pressure ($p_0$) of the entering air.

The "Venturi air pressure differential" ($p_0-p$), varies substantially in accordance with the square of the velocity of air flowing thru the venturi; and, since cross-sectional area of venturi 14 is fixed, the "Venturi air pressure differential" ($p_0-p$), is a true volumetric measure of air flow.

In order to obtain a gravimetric measure of air flow, an amount of air sufficiently small to prevent air metering deficiency is allowed to flow from inlet 12 into impact tubes 26 to conduits 28, thru conduit 32 into a chamber 34 of a fuel meter generally indicated as 36, thru a restriction 38 into a chamber 40 in fuel meter 36, out of chamber 40, thru a conduit 42, past a valve 44 and into a chamber 46; thence into conduits 48, 16 and 15 to the throat of venturi 14; i. e., from pressure ($p_0$) to pressure ($p$), via the path defined.

The valve 44 is operated by a bellows 50, one end of which is fixed in chamber 46. Bellows 50 is at least partially filled with a suitable temperature-responsive medium and sealed, thus becoming responsive to both pressure and temperature changes occurring in chamber 46, which agree with such changes occurring at the throat of the venturi 14. Movement of valve 44, one end of which is attached to bellows 50, is therefore a function of air density changes at the Venturi throat.

Valve 44 moves toward open position as the air density in chamber 46 increases, and toward closed position as the air density decreases. As the volume rate of flow of a given constant mass air flow increases owing to a decrease of air density, the "Venturi pressure differential" ($p_0-p$), increases and the component pressure drop ($p_1-p$), across valve 44 increases; but valve 44 moves toward closed position sufficiently to restrict flow past the valve the amount required to maintain a substantially constant value of component drop ($p_0-p_1$), across restriction 38 and thereby across diaphragm 58 which separates chambers 34 and 40.

A lesser amount of movement than is required for density compensation is imparted to the valve as a result of changes in mass air flow of constant density, but it is nevertheless possible to contour valve 44 so that the "effective air pressure differential" ($p_0-p_1$), is an acceptable measure of mass air flow at all values of air flow.

Fuel at superatmospheric pressure, supplied to the carburetor by a fuel pump or other means, enters conduit 52 which carries it to a main fuel inlet valve 54 in fuel meter 36; and to conduit 53 and an auxiliary inlet valve 56.

Principal elements in the course of fuel flow from the main inlet valve 54 are, successively: a fuel chamber 64, a conduit 74, a manually operated mixture control 76, a jet system 78, a conduit 72, a valve 82 in a discharge regulator 84, a conduit 86, and the discharge nozzle 22.

In fuel meter 36, a diaphragm 62 separates chamber 40 from chamber 64 in which the fuel pressure is the same as that on the upstream side of jet system 78, and is designated ($p_r$); a like diaphragm 66 separates chamber 34 from a chamber 68 in which the fuel pressure is the same as that on the downstream side of jet system 78, and is designated ($p_d$).

Considering the auxiliary valve 56 closed, the main fuel inlet valve 54 is subject to controlling forces, as follows: the force produced by the "effective air pressure differential" ($p_0-p_1$), acting on diaphragm 58, tends to open the valve; the force produced by fuel pressure ($p_d$), acting on diaphragm 66, tends to open the valve and the force produced by fuel pressure ($p_r$), acting on diaphragm 62, tends to close the valve, so that the net force produced by the fuel pressure differential ($p_r-p_d$) acting on diaphragms 62 and 66 tends to close the valve.

Thus, when auxiliary valve 56 is closed, it is seen that at any constant value of air flow the air pressure differential ($p_0-p_1$) is constant, that it is a measure of mass air flow, and that it reacts on diaphragm 58 to move valve 54 in an opening direction. Similarly, it is seen that the fuel pressure differential ($p_r-p_d$) reacts on diaphragms 62 and 66 tending to close the valve, that for any condition of constant jet area in jet system 78 the fuel pressure differential ($p_r-p_d$) is a true measure of fuel flow, that main inlet valve 54 seeks a position of equilibrium in which the opposed controlling forces are equal, or in which the force which is proportional to mass air flow equals the opposing force which is proportional to fuel flow; whence, it is apparent that fuel flow is proportional to air flow.

Jet system 78 comprises fixed area restrictions 90, 92, and 93; and an orifice 95 controlled by a pressure responsive enrichment valve biased to closed position by spring 96. Mixture control valve 102 is shown in a "lean" position which allows fuel to flow thru conduit 98 into chamber 99 thru jet 90 and into chamber 91. Rotation of valve 102 to "rich" position permits fuel to flow thru conduit 100 and jet 92 into chamber 97, thence thru jet 93 and into chamber 91.

From chamber 91, all fuel enters an orifice 104 which is effective to meter the fuel when the idle valve 106 is moved into orifice 104 in response to movement of throttle valve 20, lever 21, link 23, and lever 25. Valve 106 becomes effective only when the throttle is in a range of positions near its closed position, termed the "idling range."

In pressure regulator 84, diaphragm 108 separates fuel chamber 109 and air chamber 107 to which air pressure ($p_0$) is communicated by means of conduit 105. The diaphragm is subject to fuel pressure ($p_d$) in chamber 109. Valve 82 is operated by a force produced by spring 110 which tends to close the valve, and a force produced by the pressure differential ($p_d-p_0$) acting on diaphragm 108 to open the valve. The differential ($p_d-p_0$) is thus maintained substantially constant and, since $p_0$ is substantially constant, gage pressure ($p_d$) on the downstream side of jet system 78 is constant. Some variation in pressure ($p_d$) may be allowed, however, so the function of main valve 54 must always be regarded that of regulating the fuel pressure differential ($p_r-p_d$), except when auxiliary valve 56 is made operable.

A carburetor thus far described provides fuel flow proportional to air flow thruout the range of air flow and a consequent constant fuel-to-air ratio. The engine, however, requires a "richer" mixture of fuel and air or relatively greater fuel flow at low air flows, whether in the idling range in which the throttle is only partly open or when the throttle is wide open at low engine speed. In order to provide such richer mixture, spring 60 may be used to bias valve 54 toward open position by a constant force. This produces a constant increment of fuel pressure differential $(p_r-p_d)$, thereby a constant increment of fuel flow, and hence an increment of fuel-to-air ratio that decreases as air flow increases. Engine requirements are such, however, that desirable fuel flow at certain low values of air flow cannot be obtained by means of biasing spring 60 without prohibitive increase of the fuel-to-air ratio at other greater values of air flow.

Auxiliary valve 56 is attached by means of a stem to a diaphragm 55 which separates chambers 65 and 67. Chamber 65 is connected by means of a conduit 69 to conduit 70, and chamber 67 is connected by means of conduits 59 and 61 to chamber 64 in fuel meter 36. Valve 56 operates in a chamber 43 communicating with chamber 64 thru conduit 61. A spring 57 biases valve 56 to open position with a force opposing that produced on diaphragm 55 by the fuel pressure differential $(p_r-p_d)$. Spring 57 is adjusted so that at a predetermined value of air flow and fuel pressure differential $(p_r-p_d)$, valve 56 closes. In open position, or at all values of air flow less than the predetermined value, valve 56 allows fuel to enter chamber 64, by-passing main valve 54, thereby increasing pressure in chamber 64, causing valve 54 to move in a closing direction in an effort to restore equilibrium of forces acting on valve 54. Until air flow is increased to the predetermined value, valve 56 therefore controls both fuel pressure differential $(p_r-p_d)$ and fuel flow, which are maintained substantially constant until valve 56 closes at the predetermined value of the fuel pressure differential; thereafter, as air flow increases, main valve 54 is in full control.

Auxiliary valve 56 closes whenever the fuel pressure differential $(p_r-p_d)$ acting on diaphragm 55 overcomes the spring 57. Similarly, main valve 54 closes whenever the fuel pressure differential exceeds the value required to balance the force acting on the valve 54 thru diaphragm 58 due to the air pressure differential $(p_0-p_1)$ plus the force due to spring 60. When the valve 102 is moved to its cut-off position, the fuel pressure downstream from it becomes very low, and the pressure upstream from it becomes very high. The fuel pressure differential thereby becomes very large, and both valves 54 and 56 close.

Figure 2

Referring to the drawing, there is shown a fuel meter 36 identical with that illustrated in Figure 1 except for provision of a conduit 111, a by-pass restriction 112, and a conduit 113; and for substitution of auxiliary valve 114 and elements in housing 128 for auxiliary valve 56 and elements shown in housing 63 of Figure 1.

Considering auxiliary valve 114 wide open, the fuel meter is functionally the same as previously described in connection with Figure 1, when auxiliary valve 56 was considered closed. A small amount of fuel is allowed to by-pass jet system 78 by flowing from chamber 64 at pressure $(p_r)$ thru conduit 111 and restriction 112 into conduit 113 and chamber 68 at pressure $p_x$. However, the capacities of conduits 70 and 116 are so greatly in excess of the capacity of restriction 112 that no change in fuel pressure due to flow thru by-pass restriction 112 occurs in chamber 68; pressure $(p_x)$ therefore equals pressure $(p_d)$ and fuel pressure differential $(p_r-p_d)$ remains proportional to the effective air pressure differential $(p_0-p_1)$, or fuel flow is proportional to air flow when fixed area fuel metering jets are employed. This proportionality may be slightly varied with air flow by adjustment of biasing spring 60.

Auxiliary valve 114 is attached by means of a stem 115 to a diaphragm 126 which separates chambers 120 and 122. Chamber 120 is connected by means of conduit 130 to chamber 64 in fuel meter 36, and chamber 122 is connected by means of conduits 118, 116, and 72 to pressure regulator chamber 109 at pressure $(p_d)$.

Valve 114 operates in a chamber communicating with conduit 116 and pressure $(p_d)$. A spring 124 biases the valve to closed position with a force opposing that produced by the fuel pressure differential $(p_r-p_d)$ acting on diaphragm 126. Spring 124 is adjusted so that at a predetermined value of air flow and fuel pressure differential $(p_r-p_d)$, valve 114 opens so that flow of fuel from conduit 70 to conduit 116 is not restricted by the valve. In closed and intermediate positions of valve 114, or at all values of air flow less than the predetermined value, valve 114 retards flow of fuel from chamber 68 which is being supplied thru by-pass restriction 112; and in consequence, the pressure $(p_x)$ in chamber 68 exceeds pressure $p_d$ by whatever amount is necessary to cause main valve 54 to open to a position at which sufficient fuel flow occurs to produce a fuel pressure differential $(p_r-p_d)$ required to maintain equilibrium of auxiliary valve 114. Thus at all points less than the predetermined value of air flow, auxiliary valve 114 has control of fuel pressure differential $(p_r-p_d)$ and fuel flow, which are constant and independent of air flow. At the predetermined value of air flow, valve 114 opens to an ineffective postion and thereafter, as air flow increases, the main valve 54 is in full control of fuel pressure differential $(p_r-p_d)$.

It has been found that when a valve, such as valve 54, is held in equilibrium at a point near its seat, an undesiraable vibration characteristic develops, since if, due to vibration, the valve engages the seat, it is apt to bounce open wider than necessary to maintain its equilibrium, thereby setting up an oscillating or hunting condition. The arrangement of Figure 2 reduces or eliminates this vibration characteristic by ensuring that the valve 54 is always held off its seat by a minimum amount, under operating conditions.

Another advantage of the arrangement of Figure 2 is that the restriction 112 may be made very small, and it still will be effective to control the valve 54 to produce whatever fuel flow is required.

Auxiliary valve 114 opens to an ineffective position whenever the fuel pressure differential $(p_r-p_d)$ overcomes the spring 124. As was true in the case of Figure 1, main valve 54 closes whenever the fuel pressure differential exceeds the value required to balance forces due to air pressure differential $(p_0-p_1)$ and biasing spring 60. When valve 102 is moved to its cut-off position, the fuel pressure downstream from it becomes very low and the pressure upstream from it becomes very high. The fuel pressure differential thereby becomes very large, causing valve 54 to close and valve 114 to open. However, since conduit 111 is connected to conduit 98 downstream from valve 102, no fuel can flow thru valve 114.

Figure 3

Figure 3 diagrammatically illustrates a typical carburetor performance curve of fuel pressure differential $(p_r-p_d)$ versus gravimetric rate of air flow. Line $(b\ c)$ is normally obtained in absence of use of biasing spring 60, Figure 1 and Figure 2, and without use of auxiliary valve 56, Figure 1, or auxiliary valve 114, Figure 2. Line $(a)$ shows fuel pressure differential obtainable by use of auxiliary valves 56, Figure 1, and 114, Figure 2.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. A carburetor for an internal combustion engine, comprising a conduit for air flowing into said engine, and means associated with said conduit for producing an air pressure differential which is a measure of the rate of flow of air into said engine; a conduit for fuel flowing into said engine, a system of fixed and variable metering restrictions in said fuel conduit for regulating the flow therethru in accordance with the fuel pressure differential established thereacross; a first valve in said fuel conduit for varying the flow of fuel thru said fuel conduit, means for operating said first valve toward closed position in response to said fuel pressure differential including a pair of expansible chambers separated by movable wall structure, an inlet passage for one of said chambers, an outlet passage leading from said one chamber to the fuel conduit upstream from said system of restrictions, a passage connecting the other of said chambers to the fuel conduit downstream from said system of restrictions; second means for operating said first valve toward open position in response to said air pressure differential; a second valve in one of said passages and movable between a first position wherein it is effective to vary the pressure in one of said chambers in a fuel flow increasing sense and a second position wherein it is ineffective to vary said pressure, means responsive to said fuel pressure differential for operating said second valve, including a spring biasing said second valve in opposition to said fuel pressure differential; said second valve being adapted when in said first position to regulate said fuel pressure differential independently of said air pressure differential, thereby rendering fuel flow independent of air flow.

2. A carburetor for an internal combustion engine, comprising a conduit for air flowing into said engine, and means associated with said conduit for producing an air pressure differential which is a measure of the rate of flow of air into said engine; a conduit for fuel flowing into said engine, a system of fixed and variable metering restrictions in said fuel conduit for regulating the flow therethru in accordance with the fuel pressure differential established thereacross; a fuel meter including a first valve in said fuel conduit for varying the flow of fuel thru said fuel conduit, means for operating said first valve toward closed position in response to said fuel pressure differential, second means operating said first valve toward open position in response to said air pressure differential, and means biasing said first valve toward open position; a second valve in parallel with said first valve, means biasing said second valve to open position, means responsive to said fuel pressure differential for closing said second valve; and means operatively connecting said second valve to said meter and adapted to maintain a constant value of said fuel pressure differential independently of said first valve and first and second means operative thereof, when said air pressure differential is less than a predetermined value.

3. A carburetor for an internal combustion engine, comprising a conduit for air flowing into said engine, and means associated with said conduit for producing an air pressure differential which is a measure of the rate of flow of air into said engine; a conduit for fuel flowing into said engine, a system of fixed and variable metering restrictions in said fuel conduit for regulating the flow therethru in accordance with the fuel pressure differential established thereacross; a first valve in said fuel conduit for varying the flow of fuel thru said fuel conduit, means for operating said first valve toward closed position in response to said fuel pressure differential including a pair of expansible chambers separated by movable wall structure, a first connection between the fuel conduit upstream from said system of restrictions through one of said chambers to said fuel conduit downstream of said system of restrictions, a second connection between the other of said chambers and the fuel conduit downstream from said system of restrictions; second means for operating said first valve toward open position in response to said air pressure differential; a second valve in said second connection movable to closed position wherein it is adapted to restrict said first connection and increase pressure in one of said chambers thereby increasing force tending to open said first valve, a spring biasing said second valve to closed position, means responsive to said fuel pressure differential for operating said second valve to open position wherein it is ineffective to vary pressure in said chamber; said second valve being adapted to maintain a constant value of said fuel pressure differential independently of said first valve and first and second means operative thereof, when said air pressure differential is less than a predetermined value.

4. Valve mechanism for controlling the flow of fluid thru a conduit in accordance with a variable external condition, comprising a system of metering restrictions located between a common inlet and a common outlet in said conduit for regulating the flow therethru in accordance with the fluid pressure differential established thereacross, and a first valve in series with said metering restrictions for varying said fluid pressure differential; means responsive to said fluid pressure differential for operating said first valve in closing direction, said pressure differential responsive means including a pair of expansible chambers, and inlet passage for one of said chambers, an outlet passage leading from said one chamber to the conduit on the upstream side of said restrictions, a passage connecting the other of said chambers to the conduit on the downstream side of said restrictions; means responsive to said variable condition for operating said first valve in an opening direction; a second valve in one of said passages and movable between a first position wherein it is effective to vary the pressure in one of said chambers in a fluid pressure differential increasing sense and a second position wherein it is ineffective to vary said pressure, means responsive to said fluid pressure differential for operating said second valve, including a spring biasing said second valve in opposition to said fuel pressure differential whenever said fluid pressure differential exceeds a predetermined value, said second valve and its associated operating mechanism being adapted to control said first valve and thereby said fluid pressure differential independently of said condition responsive means whenever said fluid pressure differential falls below said predetermined value.

5. Valve mechanism for controlling the flow of fluid thru a conduit, comprising a system of metering restrictions located between a common inlet and a common outlet in said conduit for regulating the flow therethru in accordance with the fluid pressure differential established thereacross, and a first valve in series with said metering restrictions for varying said fluid pressure differential; means responsive to said fluid pressure differential for operating said first valve in closing direction, said pressure differential responsive means including a pair of expansible chambers, means for communicating the pressure on the upstream side of said restrictions to one of said chambers, and means for communicating the pressure on the downstream side of said restrictions to the other of said chambers; means responsive to a variable condition independent of said fluid flow for operating said first valve in an opening direction; a second valve movable between an open position, wherein it is effective to permit additional fluid flow to said one chamber, independently of said first valve, and a closed position wherein it is ineffective to permit said additional fluid flow, said additional fluid flow increasing pressure in said chamber thereby causing said first valve to close; a spring biasing said second valve to said open position, means responsive to said fluid pressure differential for operating said second valve to closed position against said spring whenever said fluid pressure differential exceeds a predetermined value, said second valve and its associated operating mechanism being adapted to control said first valve and thereby said fluid pressure differential independently of said variable condition responsive means whenever said fluid pressure differential falls below said predetermined value.

6. Valve mechanism for controlling the flow of fluid thru a conduit, comprising a system of metering restrictions located between a common inlet and a common outlet in said conduit for regulating the flow therethru in accordance with the fluid pressure differential established thereacross, and a first valve in series with said metering restrictions for varying said fluid pressure differentials; means responsive to said fluid pressure differential for operating said first valve in a closing direction, said pressure differential responsive means including a pair of expansible chambers, first means for communicating the pressure on the upstream side of said metering restrictions to one of said chambers, and second means for communicating the pressure on the downstream side of said metering restrictions to the other of said chambers; means responsive to a variable condition for operating said first valve in an opening direction; a restricted channel connecting said expansible chambers permitting fuel flow therebetween; a second valve in said second means movable between a closed position wherein it is adapted to prohibit fluid flow from said other chamber and an open position wherein it is ineffective to prohibit said fluid flow, said prohibition of flow being effective to cause fluid pressure increase in said other chamber thereby causing said first valve to open; a spring biasing said second valve to closed position, means responsive to said fluid pressure differential for operating said second valve to open position against said spring whenever said fluid pressure differential exceeds a predetermined value, said second valve and its associated operating mechanism being adapted to control said first valve and thereby said fluid pressure differential independently of said condition responsive means whenever said fluid pressure differential falls below said predetermined value.

7. Fuel supply control apparatus for an internal combustion engine, comprising a conduit for combustion air flowing to said engine, means associated with said conduit for producing two unequal pressures whose difference is a measure of the rate of flow of air to said engine; a conduit for fuel flowing to said engine, a metering restriction in said conduit; means for regulating the fuel pressure differential across said restriction to control the flow of fuel therethrough, first means for operating said regulating means in response to the difference of said unequal pressures and effective upon an increase in said pressures to move said regulating means in a fuel pressure differential increasing direction, second means for operating said regulating means in response to said fuel pressure differential and effective upon an increase in said fuel pressure differential to move said regulating means in a fuel pressure differential decreasing direction; said second operating means including a pair of expansible chambers separated by a movable wall structure, a pair of passages providing fluid communication between one of said chambers and points in said fuel conduit at substantially different pressures, a valve in one of said passages movable between an ineffective position and a range of effective positions wherein it is adapted to control the pressure in said one chamber in a fuel pressure differential increasing sense as it moves away from said ineffective position, a spring biasing said valve away from said ineffective position, and means responsive to said fuel pressure differential for moving said valve against said spring, said valve, spring and valve-moving means cooperating to establish a substantially constant minimum value for said fuel pressure differential.

8. Fuel supply control apparatus as in claim 7, including a valve in series with said metering restriction, a throttle for controlling the flow of combustion air to said engine, and means operative as an incident to movement of said throttle for operating said valve, said operating means being effective as said throttle approaches closed position to operate said valve in a closing direction and to open said valve at all other positions of said throttle.

9. Fuel supply control apparatus as in claim 7, in which said regulating means comprises a valve in said fuel conduit on the upstream side of said restriction, the pressure in said one chamber acts on said wall structure in a pressure differential decreasing direction, one of said passages connects said one chamber and the fuel conduit at the upstream side of the valve therein, the other of said passages connects said one chamber and the fuel conduit at the upstream side of the restriction therein, and said first-mentioned valve is located in said one passage and is biased open by said spring.

10. Fuel supply control apparatus as in claim 7, in which said regulating means comprises flow controlling means in said fuel conduit on one side of said restriction, and said passages respectively connect said one chamber with said fuel conduit at opposite sides of said restriction.

11. Fuel supply control apparatus as in claim 10, in which said flow controlling means is located on the upstream side of said restriction, said one passage connects said one chamber to the fuel conduit at the downstream side of said restriction, the valve in said one passage being wide open when in its ineffective position, and the other of said passages connects said one chamber to the fuel conduit at the upstream side of said restriction and includes a fixed restriction.

12. A carburetor for an internal combustion engine, comprising a mixing chamber having an air flow conduit and a liquid fuel flow conduit thereto, automatically actuated valve means, including means responsive to the pressure causing said fuel flow, fuel flow independently of the rate of said air flow in predetermined low air flow ranges of operation, and means for regulating the rate of said fuel flow so that it bears a substantially constant ratio to the rate of said air flow under all other conditions of engine operation.

13. A carburetor according to claim 12, including means for subjecting said fuel flow to a constant effective pressure within predetermined low air flow ranges of operation and to such a varying effective pressure as will cause said fuel flow to bear a substantially constant ratio to said flow under all other conditions of engine operation.

14. A carburetor according to claim 13, including means for producing a constant effective fuel pressure while said air flow varies from zero to a predetermined rate and such a varying effective fuel pressure as will cause said fuel flow to bear a substantially constant ratio to said air flow above said rate of air flow.

15. A carburetor according to claim 14, including means for adjusting and correlating said constant and variable effective fuel pressures so that no fuel flow irregularity occurs at the value of air flow at which said fuel pressure changes from a constant to a variable value.

16. A carburetor for an internal combustion engine, comprising a mixing chamber having an air flow conduit and a liquid fuel flow conduit thereto; means adapted to automatically regulate the rate of said fuel flow independently of the rate of said air flow in a predetermined low air flow range of operation, said means including a valve actuated by a diaphragm responsive to the fuel pressure differential which regulates said fuel flow; and means for regulating the rate of said fuel flow so that it bears a substantially constant ratio to the rate of said air flow in all other ranges of engine operation.

JOHN M. BARR.

REFERENCES CITED

The following references are of record in the file of this patent:

UNITED STATES PATENTS

| Number | Name | Date |
| --- | --- | --- |
| 1,967,619 | Justheim | July 24, 1934 |
| 2,125,886 | Chandler | Aug. 9, 1938 |
| 2,361,227 | Mock | Oct. 24, 1944 |
| 2,390,658 | Mock | Dec. 11, 1945 |
| 2,391,755 | Twyman | Dec. 25, 1945 |